Sept. 27, 1932. J. E. THORNTON 1,879,775
PRODUCTION OF CINEMATOGRAPH FILM POSITIVES
Filed April 12, 1929 2 Sheets-Sheet 1

INVENTOR.
J. E. Thornton
by Dowden O'Brien
atty.

Sept. 27, 1932.   J. E. THORNTON   1,879,775
PRODUCTION OF CINEMATOGRAPH FILM POSITIVES
Filed April 12, 1929   2 Sheets-Sheet 2

INVENTOR.
J. E. Thornton
by Jowden O'Brien
atty

Patented Sept. 27, 1932

1,879,775

UNITED STATES PATENT OFFICE

JOHN EDWARD THORNTON, OF ST. BRELADE, JERSEY, CHANNEL ISLANDS, ASSIGNOR TO JOHN OWDEN O'BRIEN, OF MANCHESTER, ENGLAND

PRODUCTION OF CINEMATOGRAPH FILM POSITIVES

Application filed April 12, 1929, Serial No. 354,714, and in Great Britain April 25, 1928.

This invention relates to the production of cinematograph film-positives by printing upon opposite sides of a transparent film a pair of component images of two different colors without sensitizing and without light, by mechanical means alone, from inked or dyed images formed upon suitably prepared printing bands, belts or negatives, the dyes from the images on the printing bands being transferred by pressure-contact and transfusion on to a strip of transparent film support, the surface of which has been suitably prepared (either by coating or which is otherwise of itself sufficiently receptive) to receive and absorb the dye upon and into its surface, or into a layer formed upon such surface, the operation being assisted if necessary by the use of suitable mordants applied to or combined with the surface of the film to be printed upon. The images are of the full-tone variety which means that the gradations are formed without dots, lines, or grains.

State of the art

A method of printing two images simultaneously in register upon opposite sides of a single strip of transparent cinematograph film was first described in my specification No. 1,250,713 which has in practice proved a very successful method and has for a long time been worked upon a large manufacturing scale. It consisted in sensitizing both sides of a transparent film and interposing a light-obstructing layer between the two sensitive emulsion layers; and simultaneously printing two images by two lights through two negatives on to the two opposite sides of the film, then dissolving the light-obstructing medium, and developing, finishing, and coloring the images, thus producing a single strip of film having two differently colored component images or parts of a picture upon opposite sides of the film.

In a paragraph of that same specification it was also suggested that the two images could be formed upon non-sensitized film by photo-mechanical or imbibition printing methods without light.

But whilst the photographic method proved satisfactory in practice, because sensitized film is always printed and registered by step by step methods one picture at a time, and therefore presented no registration difficulties, the photo-mechanical printing methods could not be successfully carried out because of registration difficulties. These are due in the first place to the fact that a prolonged period of contact is necessary for photo-mechanical imbibition printing, and therefore, in the second place, it is necessary to print a number of pictures at a time to secure a sufficiently reasonable rate of output to make the process of any value commercially. In the third place, owing to the difference in length of the printing belts or negatives and the dry blank film, perforations if made in the film would not coincide with perforations of the same pitch gauge made in the printing belts, and therefore no means of accurate registration was known at that time or disclosed by the paragraph which suggested the use of photo-mechanical printing.

Since that date considerable attention has been devoted by various research workers to discovering some means for overcoming the registration difficulties in printing by photo-mechanical or imbibition methods. And it has been proposed, for producing one set of images on a film or two sets superimposed upon the same side of the film, to stretch the negative or the film or both bands until they become the same length and their perforations thus made to coincide before printing the images, and in that way attempt to secure accurate positioning and registration.

That method is however very difficult and uncertain in its results, as will be understood when it is stated that a difference of 1/1000 of an inch in registration of two component images suffices to make the printed film useless, owing to the great displacement visible when the picture is magnified by projection on the screen.

The present invention

The present invention, among other features, deals with this registration difficulty in a very simple manner viz:—by omitting the perforations altogether from the film, printing the two component images simultaneously upon opposite sides of the blank non-perforated film, then adding the perforations after printing, and in such manner that the loss or gain arising from the difference in length between the printed film and printing belts or negatives is distributed in the space between each picture throughout the whole length of film.

Therefore, instead of the pictures being placed on the film to suit the location of the perforations of the negative as in printing on sensitized film, on the contrary in this invention the method is entirely reversed and the perforations are made in the film to suit the location of the pictures on the film. They may be placed by visual methods controlled by an operator, or automatically by a perforating machine controlled indirectly by the printing belts, or by both in combination as will be hereinafter described.

This new system of printing on blank non-perforated film, and perforating afterwards, forms the key to the successful production of cinematograph films printed by photo-mechanical means.

The process as a whole therefore comprises the following features in combination:—

1. The two printing-belts are each provided with perforations which are coincident in each pair of component images. These perforations are used for registering the belts and also for traction purposes.

2. The two belts, and therefore the two images, are accurately registered simultaneously exactly opposite each other, by registering apparatus which comprises two intergeared or interlocked sprocket wheels or drums, the teeth of which exactly fit the perforations of the two belts.

3. The blank film itself has no perforations and is not itself registered either with the belts, images or sprocket apparatus, but moves longitudinally quite freely.

4. The two images are printed upon opposite sides of the non-perforated blank film simultaneously by pressure alone.

5. The printing impression is made by nipping the blank film between the two printing belts when the two component images upon them have been brought and placed by the sprocket teeth and perforations exactly opposite each other.

6. The printing operation is completed by maintaining all three bands in close intimate contact over a prolonged period which is sufficiently long to completely lift or extract the color from the printing belts and allow it to be absorbed by the film, and whilst the three bands are still moving forward under the pressure contact of a series of geared pressure rollers between which the bands in their forward movement pass.

7. The perforations are made in the film after printing, and in such manner that loss or gain in length of the film as compared with the printing belts is compensated, so far as the perforations themselves are concerned, by dividing the difference between every picture and throwing it into the division space or line between each successive picture of the strip.

The mechanism for carrying out the registering, printing, and perforating operations forms the subject of a separate concurrent specification and claims Serial No. 366,743 filed May 28, 1929, however mechanism for producing the continuous film will now be described with reference to the accompanying drawings:—

The film is registered and printed in a machine comprising a fixed frame A carrying a number of rollers $A^1$ arranged vertically one above the other and a movable or floating frame B carrying a corresponding number of rollers $B^1$.

Figure 1:
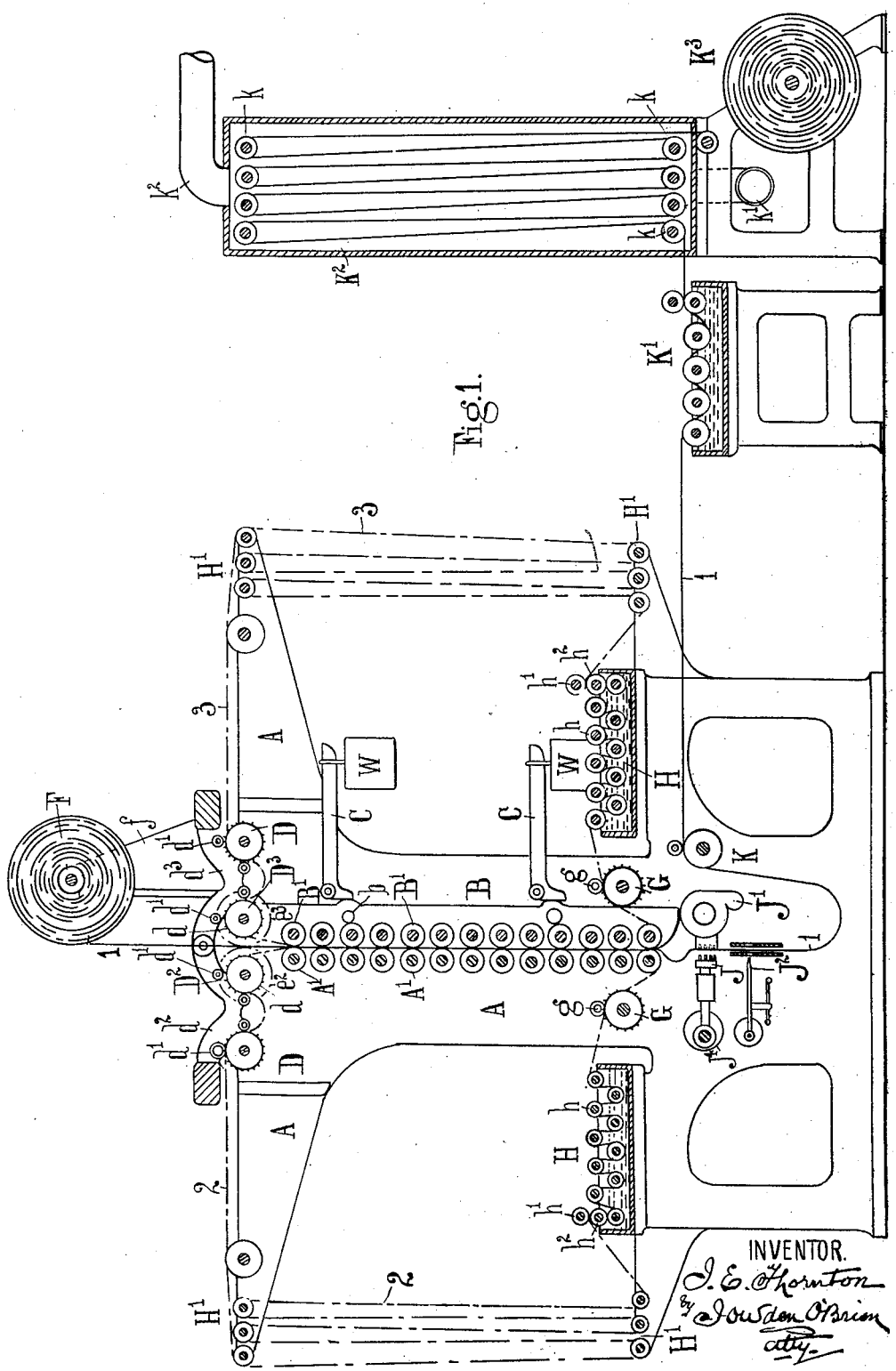
Fig. 1 is a side elevation of machine for printing simultaneously by photo-mechanical or imbibition process upon opposite sides of a transparent film a pair of component images of two different colors without sensitizing and without light.
Figure 3:
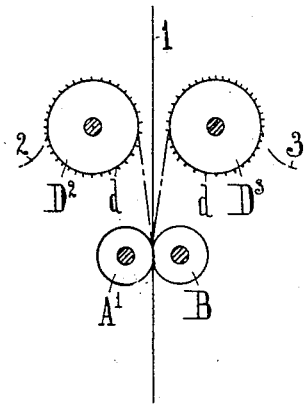
Fig. 3 is a detail view of registering sprocket.
Figure 4:
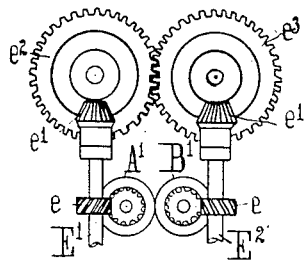
Fig. 4 is a detail view of drive for same.

The floating frame B is mounted on bearing rods or supports $b$ so that it can move laterally and is controlled by the two pivoted bell crank levers C which carry adjustable weights W to maintain uniform pressure between the rollers $A^1$ and $B^1$, even though the film strip 1 and the printing belts 2 and 3 passing between the rollers should vary in thickness, which variation might be from 1/1000 to 3/1000 of an inch.

Above the top rollers of the series $A^1$ and $B^1$ are arranged two sprocket wheels $D^2$, $D^3$ arranged a little distance apart and having their teeth $d$ spaced to correspond exactly with the spacing of the registration perforations in the printing belts 2 and 3. The printing belts 2 and 3 are held down on to the teeth $d$ of the sprocket wheels $D^2$ and $D^3$ by the weighted pivoted levers $d^2$ and $d^3$ which carry flanged rollers $d^1$ the flanges of which press on to the surface margins of the belts between the sprockets thereby holding the belts down to the root of the teeth and keeping them quite taut.

The two sprocket wheels $D^2$, $D^3$ are driven from a common shaft and are geared together by the gear wheels $e^2$, $e^3$ so that the wheels $D^2$, $D^3$ will rotate in unison without there being any backlash between them, thereby procuring the exact register of the two belts 2 and 3 which is necessary for the printing of the two component series of images on opposite sides of the film so that the two series of images may exactly coincide on the finished film.

Each of the rollers $A^1$ and $B^1$ is also positively driven (see Fig. 2) by skew gearing $e$ from the vertical shafts $E^1$ and $E^2$. The shaft $E^1$ is driven through bevel or other suitable gear $e^1$ from the shaft carrying the sprocket wheel $D^2$ and the shaft $E^2$ is driven by similar gear $e^1$ from the shaft carrying the sprocket wheel $D^3$.

Thus the sprocket wheels $D^2$ and $D^3$ and the rollers $A^1$ and $B^1$ are all geared together and are driven at the same surface speed, so that after the belts 2 and 3 have been accurately registered by the sprockets, they will remain in such accurate register until they and the film emerge from the last pair of rollers at the end of the printing operation.

The roll of non-perforated film 1 is carried on an idle spool F mounted on a stand $f$ above the sprockets $D^2$ and $D^3$ and is led down between the sprockets so that the two printing belts 2 and 3 are pressed into contact therewith as the three bands enter the nip of the first pair of rollers $A^1$, $B^1$.

After emerging from the series of pressure rollers $A^1$, $B^1$ the printing belts 2 and 3 pass over tractor sprocket wheels G being kept in contact therewith by weighted rollers $g$ and then pass over and under the rollers $h$ of the dyeing apparatus H, any or all of which rollers are positively driven. The belt leaves the dyeing apparatus between the rollers $h^1$ and $h^2$ which serve to remove the surplus dye from the belt. The belts 2 and 3 then pass up and down over the rollers $H^1$ before passing back to the sprocket D arranged immediately in front of the corresponding registration sprocket $D^2$ or $D^3$.

The sprocket wheels G, the rollers $h$ of the dyeing apparatus H and the sprockets D are all preferably driven through gearing from the main driving shaft so that they all rotate in unison with and at the same surface speed as the registration sprockets $D^2$ and $D^3$ and the pressing rollers $A^1$ and $B^1$.

The printed film 1 after leaving the last pair of pressing rollers $A^1$ and $B^1$ passes through the perforating apparatus J, a loop being formed in the film between the rollers and the perforation to permit of compensations in the positions of the perforations.

Figure 2:
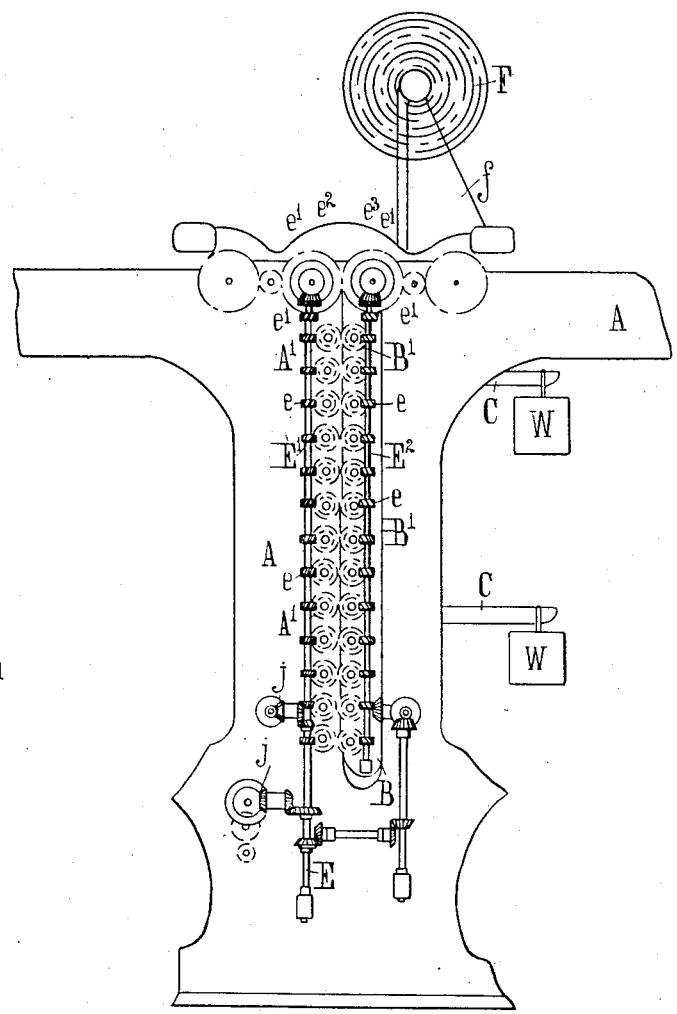
Fig. 2 is a sectional view of the gearing for the sprocket wheels and pressure rolls.

The perforator J is preferably of the eccentric plunger type having four perforating punches at each edge of the film. It is driven through gearing as shown in Fig. 2 from the driving shaft $E^1$. The perforator is so geared to the shaft $E^1$ that it makes one punching stroke for each picture space on the film. The film 1 is positioned in the perforator J by the feed claw $J^2$ of known type which has a to and fro and an up and down movement and is actuated by an essentric $j^1$ geared to the perforator J so that the claw $J^2$ makes one stroke for each picture space on the film.

As the perforator J and the feed claw $J^2$ are driven from the driving shaft $E^1$ the perforations in the film will correspond with the perforations in the printing belts 2 and 3 so that after an initial adjustment of the stroke of the feed claw of the perforator each set of perforations will be correctly placed in relation to each picture notwithstanding any contraction or expansion in the film relative to the printing belts and such difference in length of the whole film will be evenly distributed between each pair of adjacent pictures.

Guides and guide rollers are fitted at the top and bottom of the machine to prevent lateral displacement of the unperforated film during printing and perforating.

After being perforated the film 1 passes over the sprocket K to the finishing bath $K^1$ where it is treated in known manner with hardening, flexing, or varnishing agents. The film then passes through the drying chamber $K^2$ being led up and down therein over the rollers $k$ arranged at the top and bottom. The drying chamber is supplied with hot air which enters at the bottom through the pipe $k^1$ and after absorbing moisture from the film leaves the chamber through the outlet pipe $k^2$ at the top of the chamber; or it may enter at the top and exhaust from the bottom.

The finished film after passing through the drying chamber $K^2$ is finally wound on to the reel or spool $K^3$.

Figure 5:
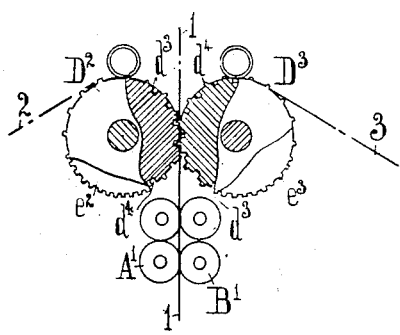
Fig. 5 is a detail view of a modified form of registering sprockets.

A modification of the sprocket registering device for the belts 2 and 3 is shown in Fig. 5 which arrangement is however only applicable where the belts are of greater width than the film 1 and have their perforations in the margins outside the film. In this arrangement the teeth of $d^3$ of one sprocket $D^2$ fit into holes $d^4$ in the other sprocket $D^3$ and the teeth $d^3$ of the sprocket $D^3$ fit into holes $d^4$ in the sprocket $D^2$ thus the perforations of the belts are engaged alternately by the teeth of the two sprockets. This arrangement ensures accurate register of the two belts but in many cases is not as convenient an arrangement for obtaining accurate register as the arrangement described above with reference to Fig. 1.

*The non-perforated blank film*

The film itself comprises a central support formed of a single strip of transparent material such as celluloid, cellulose-acetate, or equivalent material, and as already stated is without any perforations.

Both sides of the central support are adapted to receive an image and may be specially prepared for the purpose according to the particular dyeing method used.

For example, both sides may be coated with an adhesive substratum of the usual type and then each again coated with a layer of absorbent colloid, such as gelatine, and the colloid may be of a very soft and absorbent variety for some dye processes; or it may be hardened for other dye processes; or it may contain a suitable mordanting agent such for example as a salt of tin, copper, chromium, iron, aluminia, or equivalent that will assist precipitation of the color on to the film. Or any other suitable colloid may be used, such as albumen or fish-glue.

Instead of providing the film-material with a colloid surface to receive the dye-impression it may instead be of itself sufficiently receptive for dyeing direct on to the film-material itself if dyes of a suitable class are used capable of dyeing the material used for the transparent film. For example, some dyes are suitable for dyeing nitro-cellulose (celluloid) film and others are suitable for dyeing cellulose-acetate film. Either of these or other preferred forms of transparent cellulose material may be used, including also the new laminated films which have a central core of nitro-cellulose and two outer face-layers of acetate-cellulose.

The printing belts

The printing belts may be of any suitable material, for example strips of ordinary film-material, or thick bands of celluloid, or of metal, or even of paper, or a built-up series of layers of material such as paper or the like waterproofed with cellulose varnish and amalgamated together. Or it may be constructed as in my specification No. 1,361,783 but with full-tone instead of half-tone images.

The image-bearing or printing surface of each belt is also a colloid layer, preferably gelatine, which is amalgamated with the foundation of the printing belt, being indissolubly secured thereto by first giving the belt a suitable graining or toothing and then a suitable adhesive substratum (both graining and substratum being of known type), and then applying the gelatine or other colloid layer by coating a fluid solution thereof on to the substratum, either as one or more coatings or layers, or as a single coating or layer.

The printing image is formed upon each belt by sensitizing the gelatine or other colloid layer with a bichromate salt or with a silver salt made up as a gelatine emulsion, then printing the sensitive belt by light under a suitable negative or positive according to the type of image required, and subsequently developing and treating the images in such manner that parts of each image are dye-absorbent and parts become so hardened that they are dye-resistant. All these are well-known processes.

The printing-images have one image of the pair reversed in relation to the other image. According to the type of printing belt required and the dyeing process to be employed, the images are made either of flat planographic, or relief, or intaglio description, and either negative or positive in character.

The several methods are as follows:—

(A) The cliché-images are of negative character formed of soft and hardened gelatine, the soft gelatine parts of each image receiving the applied ink or dye and the hardened parts rejecting it. These cliché-images will be of flat or planographic character.

(B) The cliché-images are of positive character formed entirely of hardened gelatine (left after dissolving away the soft parts), the ink or dye being applied to the relief parts. These cliché-images will be of relief character.

(C) The cliché-images are of intaglio positive character, the depressions of the positive being formed by dissolving and washing out the soft gelatine, leaving the hardened gelatine of the cliché-image to form a color-holding container to be filled up level to its top surface with color. The color or dye is thickened by mixture with a glutinous filler such as starch, gum arabic, gum tragacinth, algin, or an equivalent to keep it from inadvertently running out of the intaglio image. The surplus color is removed by the usual ductor knife or scraper being passed over the level surface of the cliché. These cliché-images will be of intaglio character.

All these methods of printing are more or less known, and by various names such as imbibition, hydrotype dye-printing, and intaglio-printing.

Printing and registering the images

Transfer of the dye from the printing-belt on to and into the film-surface is effected by pressure-contact, the duration of such contact being dependent firstly upon the type of printing-image (flat, relief or intaglio), secondly upon the class of dye used, and thirdly upon the relative conditions of the colloid on the film and the colloid on the printing-belt. By some methods very rapid transfer of dye can be secured, but by other methods the transfer is much slower, requiring prolonged contact to extract sufficient dye from the printing belt and to absorb it sufficiently into the film-colloid.

Most of these varying factors are known to those skilled in this particular art, but are described in order to make the description complete for the whole process of producing a film according to this invention.

The main points of the invention comprise two principal features viz:—

(1) Simultaneously transferring and absorbing from two printing belts, two component images of one picture, each of a different color, on to and into two absorbent surfaces upon the opposite sides of a single transparent film, so that the two dyed impressions are located back-to-back on the one film.

(2) Securing absolutely accurate register of the two component images of the same picture by holding one of the component printing images by one registering apparatus and holding the other component printing image by another registering apparatus; the two registering apparatus being driven from a common shaft through worm or bevel gearing so that they will move in unison, or when the printing belts are wider than the film and have their perforations outside the edges of the film, the two registering apparatus may be so constructed that they interlock at the impression period, when the two printing belts and the film to be printed are so positioned that all three are squeezed together to effect the initial act of impression transfer.

In previously known and used methods of printing two dye-impression images it has been the custom to make the first series of impressions on the film and then print the second series superimposed upon the first by a second impression.

When a long contact between the printing belts and the film is necessary (as in the printing method A described above) when the printed film leaves the printing belt it may be longer or shorter due to expansion or contraction, and therefore the images on the two bands are non-coincident. I overcome that difficulty by the second step, which consists in throwing the slight differences of loss or gain into the space between each successive picture, so that it is divided over the whole length of the film between all the printed pictures.

These registering devices may comprise a pair of oppositely placed wheels or drums having accurately cut sprocket teeth projecting from the surface of each drum, the two printing belts having each a series of accurately punched perforations which are accurately spaced to the same pitch as the sprocket teeth. The two wheels or drums are preferably driven from a common shaft through worm or bevel gearing so that they will rotate in unison and ensure that the two belts move forward in correct register. After passing over the wheels or drums the two belts are pressed simultaneously, one against one face and the other against the other face of the film to be printed by a series of pairs of rollers between which the belts and the film pass, the number of such rollers and the distance the belts and film travel together depending on the length of time it is desired to keep the belts in contact with the faces of the film.

When the printing belts are made wider than the film each wheel or drum may be formed with alternating teeth and recesses so that the teeth of one wheel or drum enter the recesses in the other after passing through the perforations in the printing belts. Such a construction will always bring the pair of belts to the impression point, where one roller presses against one face of the film to be printed and the other presses against the other face. In effect they form a pair of smooth-faced drums or rollers, between which the film to be printed is gripped by the printing belts which pass over or around one half of each of the said drums. The drums may if desired, be rubber covered to provide slightly yielding impression pads.

The printing belts and blank film may be both of the same width, in which case the perforations are in the usual margins within standard width, and this is the preferred arrangement.

But alternatively the printing belts may be wider than the blank film, and have perforations in the extra margins which therefore entirely miss the film.

In the latter case the form of interlocking registration sprockets can be used, and registration and pressure begin at the same point.

Or in the former case registration upon separated sprockets, higher up than the impression contact, is effected.

Pressure contact is effected by two sets of rolls, each roll positively driven at same surface speed as all other parts of the machine, each group having its own worm shaft.

Or pressure contact may be effected between two endless rubber (or other) bands passing over the aforesaid groups of rollers.

One group of rollers and worm shaft is a fixture, the other group and its worm-shaft floats in slotted bearings and is kept pressed against the first group by adjustably weighted levers, in such manner that the printing pressure is always the same notwithstanding slight variations in thickness of the three bands, which is often from 1/1000 to 3/1000 of an inch for the whole set of three.

All the parts must be so true and of rigid construction that there shall be no possibility of slip or relative displacement of the three bands one with another.

*Perforating the film*

The blank film is non-perforated before printing, and is perforated after printing by either of two methods. In the first method the positions of the perforations are adjusted by an operator and sight control as shown in my specification No. 1,169,079. In the second method, which is the one preferred, the perforations are made automatically after printing, the perforating machine being coupled with the printing machine in such manner that the positions of the perforations are controlled by the machine. In both methods the loss or gain in length of one band compared with the other is divided between the pictures throughout the whole length of the strip of film.

The system described for printing on to blank non-perforated film from perforated photo-mechanical imbibition printing belts and then adding the perforations after printing is novel, and it overcomes the great difficulty of loss of register due to expansion or contraction of the blank non-perforated film after printing.

The blank film is drawn or fed forward by the usual means, and is accurately guided upon each side to and at the impression point, so that it is passed between the belts and sprocket rollers exactly in the right position.

The printing belts may be carried by reels from which they are fed in a forward direction for one print, and rewound in the opposite direction before making the next print, but it is preferred to make them endless in order that they may run continuously in a forward direction and repeat printing without rewinding.

The belts are supported from sprocket drums which are all driven in unison, and during their passage through the machine are fed with a fresh charge of dye to every image of the series, a different color for each printing belt, the dye being preferably fed by a set of ductor rolls which apply it to the images upon the printing belts until they are sufficiently charged.

When each pair of images reaches the printing point the film to be printed in nipped or squeezed between them, after which the three bands are led forward in the machine, still in close contact, for a long or short dwell period, to allow the dye to be drawn from the printing belts and completely absorbed into the film surfaces, after which the printing belts leave the film which then passes to the varnishing machine and drying room.

Various combinations of colors

The colors used in producing a film of this description are varied as required. For a two-color natural photograph one color will be orange-red and the other blue-green.

For a stereoscopic picture of the non-register type one image will be red and the other green.

For a monochrome picture two images can be used, one image being used to intensify the other only in parts. Or a different color used only for tinting the monochrome image either all over or in parts may be applied instead of a second image. In producing monochrome images, where there is difficulty in getting a dye that will give a transparent image to appear really black, a good black can be attained by printing two identical images upon opposite sides, but in two different colors which, when superimposed and combined will produce black.

Other modifications

For printing more than two colors the printing operations are repeated upon the same film from printing belts carrying other component images.

Thus four-color pictures can be produced at two operations by two superimposed component images upon each side of the film, and three-color pictures can be produced by two images upon one side and one upon the other side.

A single machine, operating as two sections following each other, will enable a blank film to enter at one end and emerge from the other end of the machine with a four-color or three-color picture completed thereon.

Between the first and second impressions it is desirable to interpose a thin layer of absorbent colloid to receive the second color and isolate it from the first. This is easily effected by varnishing the first color print with a thin solution of the colloid and then drying it before applying the second color print.

A combination surface, very suitable for dye-impression printing by the imbibition process hereinbefore described, can be made by a mixture of gelatine and acetate-cellulose, or by a mixture of gelatine and nitrocellulose, by using solvents common to both ingredients in making up the dope from which the film is cast. The mixture can be used as the film-material itself, or merely as a facing layer applied to other material. For such combination surface the dye used must be suited to both ingredients of the film-material.

What I claim as my invention and desire to protect by Letters Patent is:—

1. The process of producing a cinematograph or other series of two-color positive pictures upon a non-perforated transparent film by simultaneously printing in register on both sides of the non-perforated film by means of two photo-mechanical printing belts.

2. The process of producing a cinematograph or other series of two-color positive pictures by simultaneously mechanically printing in register on both sides of an absorbent faced unperforated film strip.

3. The process of producing a cinematograph or other series of two-color positive pictures upon a non-perforated transparent film which comprises the following sequence of operations:—Simultaneously registering exactly opposite to each other a pair of component images upon two photo-mechanical printing belts; then pressing the images and belts into contact with a strip of transparent film which has no registration perforations; and keeping all three strips in pressure contact until the transfer of colors from the belts on to the film is completed.

In testimony whereof I have hereunto set my hand this 28th day of March, 1929.

JOHN EDWARD THORNTON.